Patented May 21, 1946

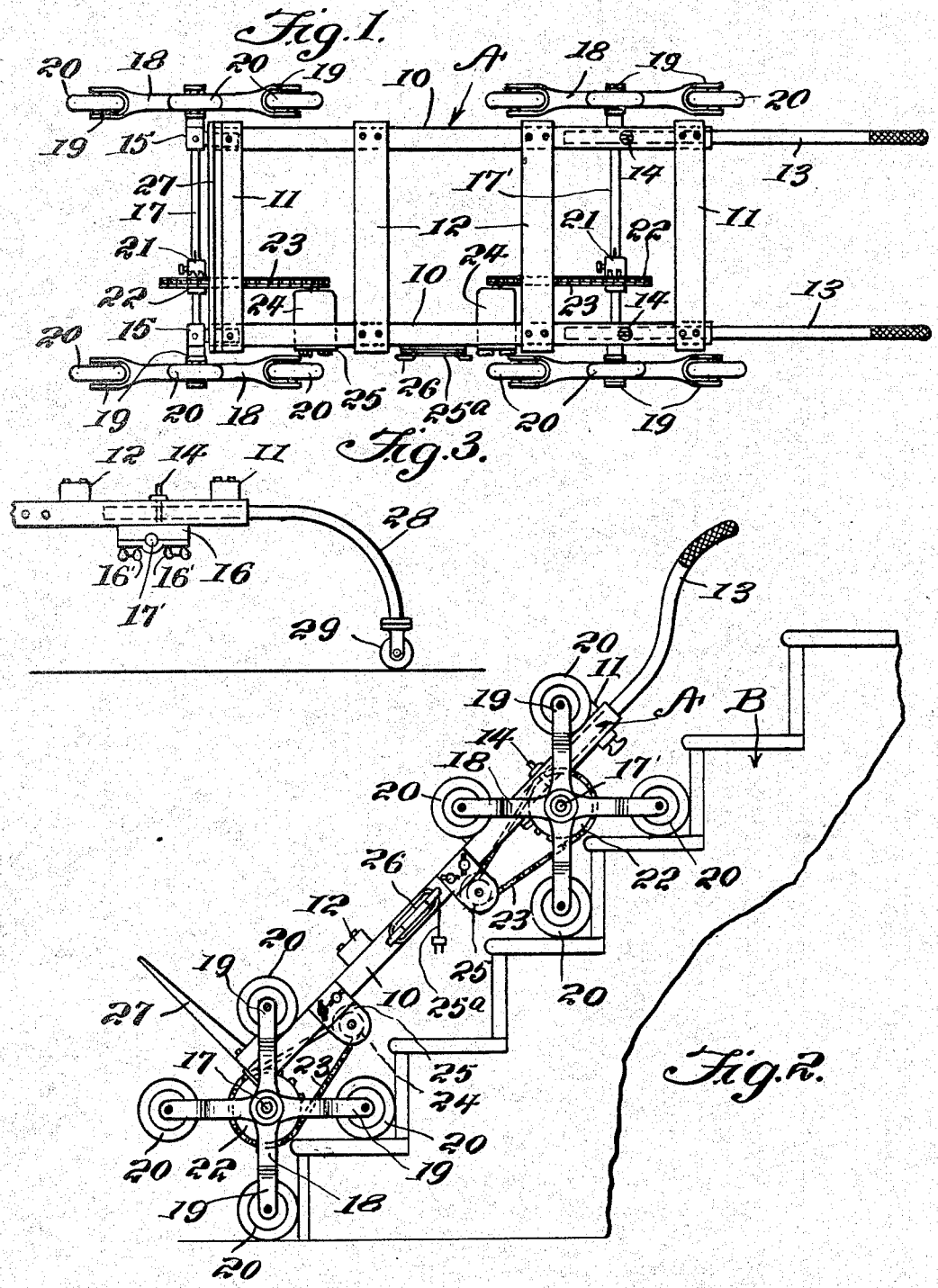

2,400,824

UNITED STATES PATENT OFFICE 2,400,824

HAND TRUCK

John I. Jackson, Norfolk, Va.

Application June 14, 1944, Serial No. 540,343

1 Claim. (Cl. 180—19)

The invention relates to wheeled trucks, and more especially to a convertible hand and motor driven truck.

The primary object of the invention is the provision of a truck of this character, wherein through a wheel arrangement it can be manually pushed or pulled or driven by a motor, and such truck is adapted to travel on a level, an incline or up and down stairways, thereby relieving the weight of a load from a user of such truck.

Another object of the invention is the provision of a truck of this character, wherein its body frame has front and rear groups of wheels, each group being revolvable, so that the truck can be caused to travel up and down stairways, when loaded or unloaded, and also may travel on grades or on a level, the said truck being susceptible of manual operation or motor driven, and is unique and novel in construction.

A further object of the invention is the provision of a truck of this character, wherein the handles thereof are adjustable and removable, so that when removed caster wheels can be substituted and thereby enabling one group of wheels to be temporarily dispensed with, this group being readily and easily detached for this purpose, the motor power mediums being also detachable or removable, at the election of a user of the truck.

A still further object of the invention is the provision of a truck of this character, wherein its construction assures convenient handling of merchandise, both in transportation and for storing thereof, without excessive labor on the part of the user of the truck.

A still further object of the invention is the provision of a truck of this character, which is simple in construction, thoroughly reliable and efficient in operation, strong, durable, readily and easily convertible from a hand to a motor driven truck, conveniently handled, assures the handling of a load with dispatch, and inexpensive to manufacture.

With these and other objects in view, the invention consists in the features of construction, combination, and arrangement of parts as will be hereinafter more fully described in detail, illustrated in the accompanying drawing, which shows the preferred embodiment of the invention, and pointed out in the claim hereunto appended.

In the accompanying:

Figure 1 is a plan view of the truck constructed in accordance with the invention.

Figure 2 is a side view thereof showing it ascending or descending a stairway.

Figure 3 is a fragmentary side view showing the attachment of a caster wheel at the handle end of the truck in substitute for handle.

Similar reference characters indicate corresponding parts throughout the several views in the drawing.

Referring to the drawing in detail, A designates generally the truck in its entirety as constructed in accordance with the invention, and such truck comprises a main frame having spaced parallel side sills 10, outer and intermediate crossbars 11 and 12, respectively, these being fastened secure in any suitable manner to be unitary with the sills, and handle bars 13. The handle bars 13 are removably and adjustably telescoped in the sills 10 at one end of the frame, the thumb screws 14 being for fastening the handle bars 13 in place.

At the other end of the frame are permanent axle bearings 15, which are carried by the sills 10, while at or near the handle bar end of such frame are arranged detachable axle bearings 16 held to the sill by thumb screws 16', the bearings 15 and 16 being dependent from the said frame. Journaled in the bearings 15 and 16 are main axles or shafts 17 and 17', each supporting four spoked wheel-forked rotors 18, both of the rotors on each axle being fixed thereto. In the forks 19 of the rotors are traction rollers or wheels 20 for surface contact. The axles 17 and 17' have slidably splined thereon, hand released clutches 21, for detachable engagement with driven sprocket gears 22 which are loosely fitted with the said axles. These gears 22 have trained thereover sprocket chains 23 powered by electric motors 24, which are detachably bracketed at 25 to the frame of the truck A. In this manner one rotor on each axle 17 and 17' can be positively driven by power transmitted thereto from the companion motor. These rotors 18 are employed to be effective in having the truck A climb a stairway B, as shown in Figure 2 of the drawing, for ascending of such stairway, or for descending the latter. The motors 24 are employed for driving the truck in ascending the stairway or for effecting the travel of the said truck when descending such stairway. When the truck A is used on a level or up and down an incline, the motors may be unclutched in their driving connections with the main axles 17 and 17', and the foremost rotor will automatically bring a pair of the rollers or wheels 20 into traveling contact with the ground or foundation when the handle bar end of the frame of the truck A is lifted to have the frame forwardly tilted so that such truck may be hand driven, identically as is the case with the usual hand truck of present day construction.

Furthermore, the truck A can be brought to a horizontal position, and in this instance, the fore and aft rotor 18 can settle to have the lowermost pairs of their rollers or wheels 20 contact the ground or foundation, whereby the said truck can be used as a movable carriage or load carrier.

Each motor 24 can be supplied with electric current source by a detachable connector cord 25a, which may be carried at the side of the truck A on a hanger 26, and included with such connector may be a "cut-off" and "on" switch of any selected construction, not shown.

On the forward end of the frame is an upstanding fender 27 to hold a load upon the truck A when its frame is disposed at a forward incline, there may be employed side-boards, not shown, for the truck body.

In Figure 3 of the drawing, there is shown substituted for each handle bar 13, a caster wheel hanger 28, having the caster wheel 29, and in the use of the latter the motor 24 next to the handle bar end of the frame of the truck A is removed therefrom, and also there is removed the rearmost rotors 18 and adjuncts thereto, so that the truck when lowered to a horizontal position for use as a carriage can be conveniently guided and wheel supported at its rear. This caster arrangement may be useful when the truck is descending a stairway with the rearmost rotor 18 removed.

The spokes of the rotors 18 are set at substantially right angles to each other and of the required uniform length with respect to one another throughout each rotor, the frame of the truck A being of any desired length and width, while the handle bars 13 can be adjusted for lengthening and shortening thereof.

What is claimed is:

A truck of the kind described, comprising an elongated load carrying frame, fore and aft shafts carried by said frame, spokes carried by the shafts, traction wheels carried by the outer end of the spokes, motors mounted on said frame, individual drive means between each shaft and each motor, clutch means on each shaft and means on the end of said frame for removably receiving handle bars for said frame, whereby upon disengagement of the clutch means said traction wheels will rotate with their respective shafts free of said drive means when the truck is manually moved by the handle bars.

JOHN I. JACKSON.